United States Patent [19]
Klar et al.

[11] 3,986,032
[45] Oct. 12, 1976

[54] SELF-POWERED NEUTRON DETECTOR FOR EXTERNAL REACTOR INSTRUMENTATION

[75] Inventors: Erich Klar, Karlsruhe; Hans-Gerd Spillekothen, Bensberg; Pierre Haller, Erlangen, all of Germany

[73] Assignee: Kraftwerk Union Aktiengesellschaft, Mulheim (Ruhr), Germany

[22] Filed: Dec. 3, 1974

[21] Appl. No.: 529,030

[30] Foreign Application Priority Data
Dec. 3, 1973 Germany............................ 2360221

[52] U.S. Cl............................... 250/390; 313/61 D
[51] Int. Cl.². ............................................. G01T 3/00
[58] Field of Search................... 250/390, 391, 392; 313/61 D, 61 R

[56] References Cited
UNITED STATES PATENTS

| | | | |
|---|---|---|---|
| 3,067,329 | 12/1962 | Linden | 313/61 D X |
| 3,603,793 | 8/1969 | Warren | 313/61 D |
| 3,872,311 | 3/1975 | Goldstein et al. | 250/390 |

*Primary Examiner*—Archie R. Borchelt
*Attorney, Agent, or Firm*—Kenyon & Kenyon Reilly Carr & Chapin

[57] ABSTRACT

A self-powered neutron detector comprises a tubular collector, a tubular emitter surrounding this collector, and a tubular collector surrounding this emitter, with electrical insulation between the emitter and the two collectors. The collectors are electrically interconnected. This arrangement produces a detector suitable for external instrumentation on the outside of the pressure vessel of a reactor, for instance, a pressurized-water reactor.

8 Claims, 5 Drawing Figures

3,986,032

SELF-POWERED NEUTRON DETECTOR FOR EXTERNAL REACTOR INSTRUMENTATION

BACKGROUND OF THE INVENTION

Self-powered neutron detectors are known, examples being Treinen et al. U.S. Pat. No. 3,390,270, dated June 25, 1968, Anderson U.S. Pat. No. 3,400,289, dated Sept. 3, 1968 and Shields U.S. Pat. No. 3,787,697, dated Jan. 22, 1974.

In all of the prior art detectors, the emitter has been in the form of a rod or wire having a length substantially greater than its cross sectional area, whether or not the emitter has been made of solid material or in powder form enclosed in an insulating tube. These prior art detectors have been designed to operate in the core of a nuclear reactor, inside of the reactor vessel, such as within the core of a pressurized-water reactor, with the core and the detector on the inside of the vessel.

On the outside of the vessel, as in the case of external instrumentation, the prior art detectors are not sensitive enough to permit their practical use. If their sensitivity is increased by the use of unconventionally used materials, their operating life is shortened to an impractical degree by the burn-up of such materials.

Therefore, for the external instrumentation, using detectors outside of the pressure vessel of a pressurized-water reactor, it has been necessary to obtain neutron flux measurements by the use of ionization chambers requiring a supply by a high-voltage electric current. This is not only objectionable, but, in addition, the use of such an expedient has been troubled by the fact that the ionization chambers are undesirably temperature-sensitive.

SUMMARY OF THE INVENTION

According to the present invention, a self-powered neutron detector is formed by a tubular collector, a tubular emitter surrounding this collector and a tubular collector surrounding this emitter. Electrical insulation is positioned between the emitter and the two collectors and the latter are electrically interconnected. With this arrangement of super-imposed tubular elements, it is possible to accommodate, with overall dimensions not greatly substantially more than the prior art self-powered detectors, a self-powered neutron detector of adequate sensitivity to be used as part of the external instrumentation on the outside of the pressure vessel of a pressurized-water reactor.

The three tubular components, with their interposed insulation, may have the innermost one of the two collectors, supported internally by a structurally rigid ceramic tube, permitting the detector to be made as a stable structure. The electrical connection with the emitter can be made radially through such a tube.

The two collectors can be made axially longer than the tubular emitter, and have flanged ends which by interwelding produces a structurally strong unit with the emitter completely enclosed. When materials of low machinability are involved, the tubular components may be made from helically wound flat strips, possibly overlapped if a greater wall thickness is indicated.

For simplified construction, the three tubular components may be cylindrical, but if greater sensitivity is desired, the three components may be made with an axially corrugated configuration with the inner crests of the corrugations supported by the internal structurally rigid ceramic tube.

BRIEF DESCRIPTION OF THE DRAWINGS

Presently preferred modes for carrying out the invention are schematically illustrated by the accompanying drawings, in which.

DETAILED DESCRIPTION OF THE INVENTION

Figure 1:
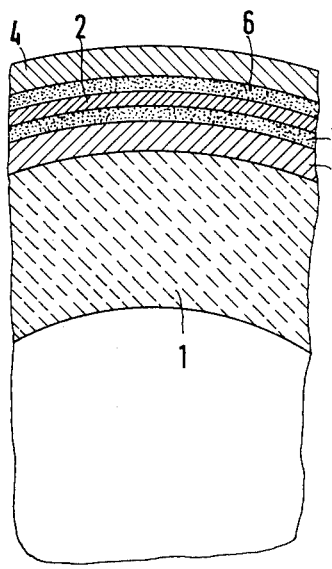
FIG. 1 shows in cross section a segment of the new tubular neutron detector.
Figure 2:
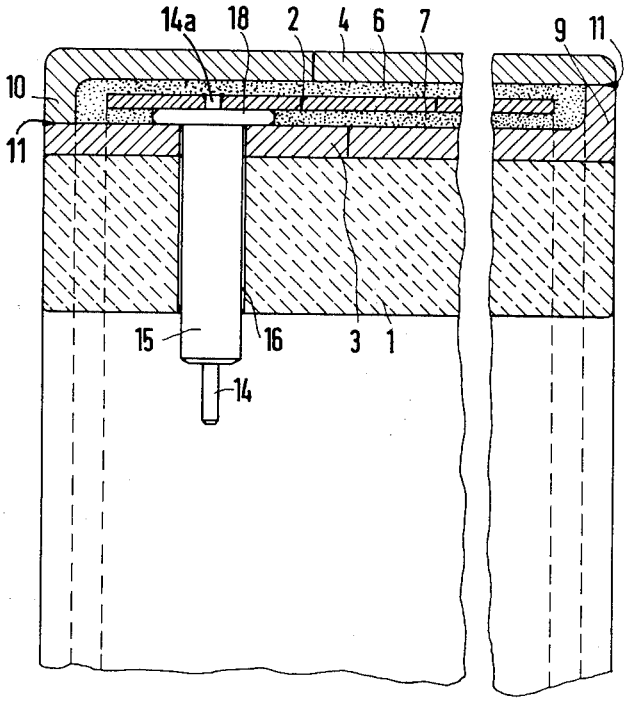
FIG. 2 is a longitudinal oraxially extending section.

Having reference first to FIGS. 1 and 2, the inner and structurally rigid supporting ceramic tube 1 is shown, possibly having an inside diameter of 66 mm and an outside diameter of 85 mm. The tubular collector 3 is supported on this tube 1, and in the event it is made of one of the collector materials which can be machined only with difficulty, it may be formed from a helically coiled strip with the convolutions forming the tubular shape. The outer tubular collector is shown at 4 while the interposed tubular emitter is shown at 2, electrical insulation 6 being interposed between the tubular emitter 2 and the outermost tubular collector 4, while corresponding insulation 7 is positioned between the emitter 2 and the innermost tubular collector 3 supported by the tubular ceramic member 1. The tubular emitter 2 may be made from cadmium or gadolinium and have a wall thickness of about 1 mm. The tubular emitter is supported by the insulation 7 which is, in turn, supported by the innermost collector 3 rigidly supported by the ceramic structural tubular member 1. Each of the tubular collectors 3 and 4 may have a wall thickness of about 2 mm and be formed from tin, zirconium and Inconel, for example, and are spaced by the insulation 6 and 7, respectively, about 1 mm apart in the radial direction. The electrical insulation layers 6 and 7 may be made from aluminum oxide ($Al_2O_3$), for example.

As can be seen from FIG. 2, the tubular collectors 3 and 4 are longer than the tubular emitter 2, so that the collectors extend in opposite directions beyond the ends of the tubular emitter. For example, the tubular collectors may be 670 mm long while the tubular emitter may be 660 mm long. The ends of the two tubular collectors 3 and 4, have flanges 9 and 10, respectively, the flange 10 being inwardly extending and the flange 9 being outwardly extending and the flanges being joined to the tubular collectors by welding seams 11. This construction is that the tubular emitter 2 is completely enclosed by the metal of the tube collectors 3 and 4, respectively. This provides a completely enclosed and mechanically stable structure.

As shown by FIG. 2, a lead-in wire 14, enclosed in an insulating sleeve 15, extends radially through the ceramic tube 1, through a hole 16, the wire 14 being welded to the emitter 2 as indicated at 14a, a corresponding passage being formed through the inner tubular collector 3 from which the conductor 14 is separated by the insulation sleeve 15. A plate 18 of insulating material, embedded in the insulation 7, provides for substantially hermetic sealing. With the two tubular collectors 3 and 4 electrically interconnected by the welded flange arrangement, electrical contact with them may be effected in the usual manner as by contactors gripping the outside of the tubular collector 4.

This new neutron detector can be used at temperatures up to 500° C. When neutron irradiated, it furnishes Compton electrons due to n-gamma processes without requiring external power. If the emitter and collector components are produced of materials of approximately the same atomic, number, substantially complete gamma compensation is possible. As previously indicated, depending on fabrication problems, the tubular components can be formed by helically wound strips of the appropriate materials, possibly with overlapping layers as required to provide the necessary wall thickness. Therefore, it becomes possible to apply the principles disclosed by the U.S. Klar et al. U.S. Pat. No. 3,904,881 dated Sept. 9, 1975, issued on U.S. application Ser. No. 386,439, filed Aug. 7, 1973.

Figure 3:
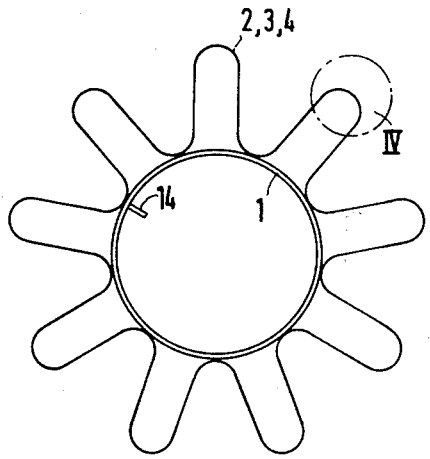
FIG. 3 is a cross section showing a modification.
Figure 5:
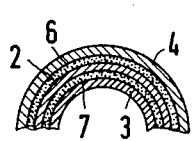
FIG. 5 shows the configuration of a further possible modification.
Figure 4:
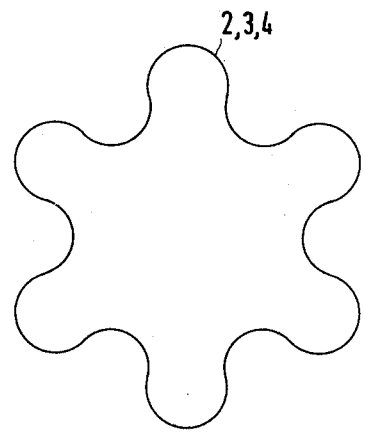
FIG. 4 is a detail taken from FIG. 3.

The generally described construction is illustrated by FIG. 3 excepting that in this instance the tubular components are formed with an axially or longitudinally extending corrugated contour, the components being the same as previously described as indicated by FIG. 4 which in cross section shows the portion encircled by the broken line circle IV in FIG. 3. In this way even a greater sensitivity is obtained than by the multiplicity of the tubular components in their superimposed relationship previously described. Structural strength is provided by the ceramic tube 1 as shown by FIG. 3. FIG. 5 suggests a further possible external configuration.

In general, with the tubular components of FIGS. 1 and 2 a structurally strong detector can be provided, and because of the greater area and multiplicity of components, a sensitivity can be obtained permitting the new detector to be used for external instrumentation on the outside of the reactor pressure vessel without the high voltage supply requirement previously required. The only adequately sensitive detector available was the ionization-chamber type.

The mutually corrugated forms of FIGS. 3 to 5, showing the possibility of varying numbers and configurations of the radiating ribs formed by the corrugated shapes, can be used when even further sensitivity is desired.

In all cases, the internal ceramic tube 1 supports the three superimposed tubular components comprising the inner and outer tubular collectors enclosing and protecting the interposed tubular emitter, the aluminum oxide or other electrical insulation between the tubular components being capable of being tamped firmly so that the result is a detector that is not only sensitive enough for external instrumentation use, but also which is mechanically rugged.

What is claimed is:

1. A self-powered neutron detector comprising a tubular collector, a tubular emitter surrounding said collector, a tubular collector surrounding said emitter, and electrical insulation between said emitter and said collectors, said collectors being electrically interconnected.

2. The detector of claim 1 in which said emitter and said collector are radially interspaced equally.

3. The detector of claim 1 in which said collectors are longer than said emitter and the collectors have ends connected to each other so the emitter is enclosed by the collectors and the collectors are electrically interconnected.

4. The detector of claim 3 in which said ends have flanges extending radially from one collector to the other and having welded seams interconnecting the collectors.

5. The detector of claim 1 having a structurally rigid internal support made of heat-resistant electrical insulating material.

6. The detector of claim 5 in which said support is tubular and an electric conductor extends from its inside radially through the support and electrically connects with said tubular emitter.

7. The detector of claim 1 in which at least one of said emitter and collectors is formed from a helically wound strip.

8. The detector of claim 1 in which said emitter and collectors are longitudinally corrugated.

* * * * *